Jan. 30, 1940.  W. D. HOCKENSMITH, JR  2,188,786
MINE CAR WHEEL
Filed Dec. 9, 1937
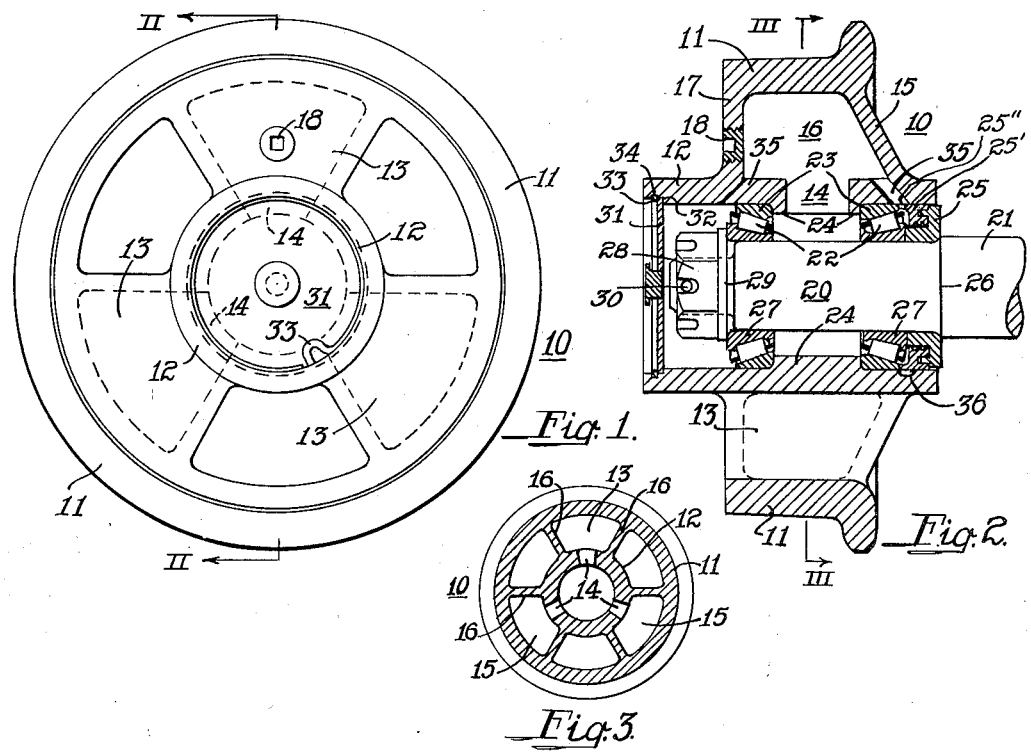
INVENTOR.
Wilbur D. Hockensmith Jr.
BY Green & McCallister
His ATTORNEYS.

Patented Jan. 30, 1940

2,188,786

UNITED STATES PATENT OFFICE 2,188,786

MINE CAR WHEEL

Wilbur D. Hockensmith, Jr., Irwin, Pa.

Application December 9, 1937, Serial No. 178,862

6 Claims. (Cl. 308—110)

This invention relates to wheels, and more particularly to improvements in the construction of wheels for mine cars and in the means for lubricating such wheels.

One object of the present invention is to provide a mine car wheel having an exceedingly large lubricant reservoir formed therein and from which a suitable lubricant will be delivered to the wheel bearings each time the wheel comes to rest and pumped back into the reservoir while such wheel is turning.

Another object of this invention is to provide a mine car wheel having tapered spokes of substantially hollow box-like construction which may be used as lubricant reservoirs and which are materially stronger than the common straight or curved spokes of solid construction now in general use.

A further object of this invention is to provide a sturdy and rugged mine car wheel which has low resistance to turning movement. I obtain this object by making the spokes of the wheel of hollow box-like construction which open into the hub of the wheel and by spacing such spokes circumferentially around the hub in such manner that regardless of the position of the wheel, the opening of at least one such spoke is above the top of the axle and the wheel bearings whereby a quantity of lubricant is delivered to the axle and wheel bearings at least each time the wheel comes to rest. I also provide ports in the hub outside of the ends of the bearings and leading into the hollow spokes which return the excess lubricant delivered to and pumped through the bearings back into the hollow spokes, thereby preventing waste and loss of lubricant, but lubricant may work out around the collars at the ends of the wheel hub to seal or carry away any dirt that might work in toward the wheel bearings.

These and other objects which will hereinafter be made apparent to those skilled in this particular art are accomplished by means of the invention described in the following specification and illustrated in the accompanying drawing, wherein:

Figure 1 is a view in front elevation of a mine car wheel made in accordance with my invention and having a hub designed for tapered roller bearings;

Fig. 2 is a section taken on line II—II of Fig. 1 showing the wheel and bearing supports therefor in relation with an axle; and Fig. 3 is a reduced sectional view taken on line III—III of Fig. 2, the axle and bearings being removed for convenience of illustration.

In Figs. 1 to 3, inclusive, of the drawing, I have shown a mine car wheel 10 made in accordance with my invention and having a flanged rim 11 of the usual construction, which is connected to a hub 12 by a series of circumferentially spaced tapered spokes 13 of hollow, boxlike construction. Communication between the interiors of the spokes 13 is established through hub ports 14, one for each spoke. Each of the hollow spokes 13 includes a back wall or web 15 joining the rim to the hub at the back of the wheel, a pair of side walls 16 at each end of the back wall which extend transversely of the rim 11 and also connect the rim 11 with the hub 12, and a front wall or web 17 which connects the front edges of the side walls 16 and also connects the rim 11 with the hub 12. The walls 15 and 16 of the wheel are formed integrally with the hub and rim during the casting of the wheel and the hollow constructions obtained by coring out the interior of each of the spokes 13. The hollow spokes 13 form oil or grease reservoirs or storage spaces and the front wall 17 of at least one of the spokes is provided with an opening which may be closed by any suitable valve or plug 18.

Wheel 10 is adapted to be mounted on the reduced end 20 of a suitable axle 21 and the hub 12 of the wheel is designed so that tapered roller bearings 22 may be positioned between the axle and the hub. In mounting the wheel on the axle 21, front and rear cups 23 of the bearings 22 are pressed into the opposite ends of the hub 12 into abutting engagement with the opposite sides of a shoulder 24 which is formed on the inside of the hub and a two-piece dust collar 25, one part of which is shrunk on the axle adjacent the shoulder 26 formed between the reduced end 20 and the main body of the axle 21, and the other part 25' of which is pressed into the bore of the wheel up against the edge of the rear cup 23. After the cups 23 have been press fitted into the hub, the cone 27 carrying the roller bearings for the rear bearing is slip fitted over the axle and moved into engagement with the inner face of the dust collar 25. The wheel is then slipped over the reduced end 20 of the axle and the cone 27 for the front or outer bearing is then slipped over the end of the axle to bring the rollers carried thereby into engagement with the cup of the front bearing. The wheel is secured on the axle by nut and washer elements 28—29 which engage the cone 27 of the outer bearing and are locked in position on the axle by cotter pin 30.

The outer end of the hub 12 is closed by a disc 31 which abuts against a shoulder 32 on the inside of the hub 12. The disc 31 is held in place in the hub by a spring or snap ring 33 which is received in an annular groove 34 cut in the hub 12.

After the wheel 10 has been mounted on the reduced axle end 20, the plug 18 is removed and a lubricant such as semi-fluid grease is introduced into the ported spoke 13. The grease passes through the port 14 and around the axle end 20 into the other spokes of the wheel by way of their ports 14, until all the spokes are filled, sufficient lubricant being supplied to accomplish the same.

With a wheel constructed in accordance with my invention, it is apparent that lubricant is poured down on the axle between the inner and outer bearings 22—22 each time the wheel comes to rest, due to the fact that the spokes are so spaced that one of them always stops in such position that the port 14 leading therefrom is above the top of the axle. Each hollow spoke 13 forms a lubricant storage or supply chamber from which lubricant is fed through its port 14. When the wheel is running slowly, some of the lubricant in the hollow spokes 13 will find its way to the bearings and adequately lubricate the same. However, under general operating conditions, all mine cars are stopped and started many times a day and since lubricant is delivered to each bearing during each stopping period, the bearings are always running in lubricant and excessive wear on the bearings is, therefore, eliminated.

It should also be noted, that with my improved wheel the lubricant is always introduced into the bearings at the smaller ends thereof and passes through the bearings to the larger ends thereof. It is well recognized that tapered roller bearings pump oil from the smaller to the larger end thereof and in order to prevent the lubricant pumped through the bearings 22—22 from being lost or pumped between the dust collar 25 and the hub of the wheel and from being packed back of the disc 31, return ports 35 are formed in the hub 12 which communicate with the hollow spokes 13. Slots 25'' are provided on the inner edge of part 25' which register with the return ports 35. To facilitate the delivery of the lubricant passing through the slots 25'' into the ports 35 at the ends of the hub, a channel or groove 36 is provided in the hub which connects the inner ends of such ports. Thus, as the wheel rotates, the lubricant delivered from the hollow spokes during the periods of rest will be pumped through the bearings 22—22 and returned to the storage reservoirs in the hollow spokes 13 through the ports 35 even though the part 25' has been turned relatively to the hub moving the slots 25'' out of registry with the ports 35.

From the foregoing description, it is apparent that I have provided a mine car wheel having large oil or grease storage or supply chambers which are so arranged that lubricant is delivered from at least one of the chambers to the axle and to the bearings of the wheel each time the wheel comes to rest. This results from the fact that the chambers are so spaced that the port leading from one of them is always above the top of the axle while at the same time a substantial lubricant storage space is provided below the bearings or below the level of the axle. The lubricant storage chambers are all filled through the opening in one spoke, the lubricant passing around the axle into the other hollow spokes and, in practice, I prefer to fill the hollow spokes with lubricant when the car is first put in service. By using a semi-fluid grease as a lubricant, the wheels are also permitted to turn freely and I have found that the resistance to turning movement in my improved wheels is much less than in wheels lubricated in the usual manner.

While I have described my improved car wheel particularly in connection with tapered roller bearings, it is to be understood that certain changes, modifications, additions and omissions may be made without departing from the spirit of my invention or from the scope of the appended claims.

Having thus described my invention, what I claim as new and desire to secure by Letters Patent is:

1. A wheel adapted to rotate about an axle which comprises a series of lubricant reservoirs integral with said wheel, tapered roller bearings mounted between said axle and said wheel, means for delivering lubricant from said reservoirs to said bearings and means for returning to said reservoirs lubricant which has passed beyond said bearings.

2. A wheel hub within which an axle is adapted to be rotatively received which comprises a plurality of lubricant reservoirs formed integral with said wheel, tapered roller bearings mounted between said axle and said hub, delivery ports in said hub for effecting communication between said lubricant reservoirs and the bearings and return ports in said hub adapted to discharge to said reservoirs lubricant which has passed beyond said bearings.

3. A wheel having a hub within which an axle is adapted to be rotatively received which comprises a series of grease reservoirs integral with the wheel, tapered roller bearings between said axle and said hub disposed in such manner that the bearings taper toward each other, means for delivering grease from said reservoirs to said bearings between said bearings and means for returning to said reservoirs grease pumped through said bearings during rotation of said wheel.

4. A wheel comprising a hollow hub within which an axle is adapted to be rotatively received, a flanged rim, a plurality of hollow spokes extending radially between said hub and said rim, a plurality of relatively large ports in said hub giving communication between said hollow spokes and the interior of said hub, tapered roller bearings mounted between said hub and said axle and relatively small return ports in said hub effecting communication between the outer sides of said bearings and said hollow spokes.

5. A wheel comprising a hollow hub adapted to rotatively receive an axle, a flanged rim, walls connecting said hub and rim and certain of which are so disposed as to form a plurality of hollow spokes extending radially between said hub and said rim, a plurality of relatively large delivery ports in said hub and giving communication between said hollow spokes and the interior of said hub, tapered roller bearings mounted between said hub and said axle and relatively small return ports in said hub effecting communication between the outer sides of said bearings and said hollow spokes, said roller bearings being so arranged as to have their small ends toward the center of the wheel, said hub being extended to form a chamber, elements closing the outer end of said chamber, a groove in said hub communicating with one of said return ports and said delivery ports being disposed between the small ends of the bearings.

6. A wheel comprising a hollow hub within which an axle is adapted to be rotatively received, a flanged rim, a plurality of hollow spokes extending radially between said hub and said rim, a plurality of relatively large ports in said hub giving communication between said hollow spokes and the interior of said hub, tapered roller bearings mounted between said hub and said axle and relatively small return ports in said hub effecting communication between the outer sides of said bearings and said hollow spokes, each such hollow spoke being made up of a front wall, a back wall and a pair of side walls arranged to define a chamber extending from the hub to the rim of the wheel.

WILBUR D. HOCKENSMITH, Jr.